US008575774B2

(12) United States Patent
Berendt et al.

(10) Patent No.: US 8,575,774 B2
(45) Date of Patent: Nov. 5, 2013

(54) GENERATOR-STREAM TURBINE-TURBOCOMPRESSOR STRING REGULATED BY VARIATION OF A MAINS POWER SUPPLIED AND BY A LIVE STEAM FEED AND METHOD FOR OPERATING THE SAME

(75) Inventors: Oliver Berendt, Görlitz (DE); Jens Hampel, Bautzen (DE); Olaf Schmidt, Görlitz (DE)

(73) Assignee: Siemens Aktiengesellschaft, München (DE)

( * ) Notice: Subject to any disclaimer, the term of this patent is extended or adjusted under 35 U.S.C. 154(b) by 531 days.

(21) Appl. No.: 12/680,973

(22) PCT Filed: Oct. 1, 2008

(86) PCT No.: PCT/EP2008/063149

§ 371 (c)(1), (2), (4) Date: Mar. 31, 2010

(87) PCT Pub. No.: WO2009/043875

PCT Pub. Date: Apr. 9, 2009

(65) Prior Publication Data

US 2010/0213709 A1 Aug. 26, 2010

(30) Foreign Application Priority Data

Oct. 4, 2007 (EP) .................................... 07019475

(51) Int. Cl.
*H02P 9/04* (2006.01)

(52) U.S. Cl.
USPC ........................................................ 290/52

(58) Field of Classification Search
USPC ........................................................ 290/52
See application file for complete search history.

(56) References Cited

U.S. PATENT DOCUMENTS

| | | | | |
|---|---|---|---|---|
| 4,441,028 | A * | 4/1984 | Lundberg | 290/52 |
| 4,680,933 | A | 7/1987 | Bozung | |
| 5,203,160 | A * | 4/1993 | Ozono | 60/778 |
| 2001/0004830 | A1* | 6/2001 | Wakana et al. | 60/39.182 |
| 2002/0067042 | A1* | 6/2002 | Alvarez Ortega et al. | 290/2 |
| 2003/0052485 | A1* | 3/2003 | Poteet et al. | 290/4 R |
| 2006/0283206 | A1* | 12/2006 | Rasmussen et al. | 62/619 |
| 2008/0022687 | A1* | 1/2008 | Althaus et al. | 60/727 |
| 2008/0047275 | A1* | 2/2008 | Ziminsky et al. | 60/776 |
| 2008/0272597 | A1* | 11/2008 | Althaus | 290/52 |

FOREIGN PATENT DOCUMENTS

| | | | | |
|---|---|---|---|---|
| CH | 696980 | A5 | | 2/2006 |
| CH | 696980 | A5 | * | 2/2008 |

(Continued)

OTHER PUBLICATIONS

Communication from Chinese Patent Office stating cited reference, pp. 1-13.

*Primary Examiner* — Tulsidas C Patel
*Assistant Examiner* — S. Mikailoff

(57) ABSTRACT

A generator-steam turbine-turbocompressor-string is provided. The generator-stream turbine-turbocompressor-string includes a generator with variable frequency, a steam turbine and a turbocompressor which can be driven by the generator and/or the steam turbine. The generator and the steam turbine are coupled together to a shafting, wherein the generator may be electrically coupled to an electrical power supply system for power supply feeding and the steam turbine may be connected to a live steam feeding device for the feeding of live steam to the steam turbine, such that the generator-steam turbine-turbocompressor-string has a rotational speed which is controllable by varying the power supply feeding and/or by the live steam feeding.

5 Claims, 2 Drawing Sheets

(56) References Cited

FOREIGN PATENT DOCUMENTS

| | | | | |
|---|---|---|---|---|
| CN | 1864042 | A | | 11/2006 |
| JP | 58005407 | A | * | 1/1983 |
| JP | 62099602 | A | * | 5/1987 |
| JP | 62131798 | A | | 6/1987 |
| SU | 1382408 | A3 | | 3/1988 |
| SU | 1623077 | A1 | | 8/1995 |
| WO | WO 2006084809 | A1 | * | 8/2006 |

* cited by examiner

GENERATOR-STREAM TURBINE-TURBOCOMPRESSOR STRING REGULATED BY VARIATION OF A MAINS POWER SUPPLIED AND BY A LIVE STEAM FEED AND METHOD FOR OPERATING THE SAME

This application is the US National Stage of International Application No. PCT/EP2008/063149, filed Oct. 1, 2008 and claims the benefit thereof. The International Application claims the benefits of European Patent Office application No. 07019475.8 EP filed Oct. 4, 2007. All of the applications are incorporated by reference herein in their entirety.

FIELD OF INVENTION

The invention relates to a generator-steam turbine-turbocompressor string and a method for operating the generator-steam turbine-turbocompressor string.

BACKGROUND OF INVENTION

A turbocompressor may be used, for example, in a plant in the chemical industry. In the plant there is normally a supply of thermal energy in the form of process steam. This process steam is made available in a process steam system, from which the process steam can be drawn off to drive a steam turbine. The steam turbine is usually used to drive the turbocompressor.

Normally, the turbocompressor is operated in various operating states, which can be associated with different rotation speeds of the turbocompressor. Usually, the rotation speed of the turbocompressor influences the drive power consumed by the turbocompressor, where the thermal power provided from the process steam system is usually greater than the power which is required to drive the turbocompressor. This surplus power increases as the power consumption of the turbocompressor reduces.

Usually, this excess power is not used, or it is fed into an additional turbine set which is installed in the plant and consists of a steam turbine and a generator.

FIG. 2 shows a steam turbine set having a generator 101 and a steam turbine 102. The steam turbine 102 drives the generator 101 via a first coupling 104. For the purpose of driving the steam turbine 102, live steam is fed in from a live steam line 106 to the steam turbine 102. The electrical power produced by the generator 101 is input into an electrical network 107.

In addition, the steam in the live steam line 106 is used to drive another steam turbine 108, which is in turn coupled via a coupling 105 to drive a turbocompressor 103. The rotation speed of the turbocompressor 103 is regulated by means of a rotation speed feedback device 109, which controls a live steam valve **108*a*. Thus when a predetermined rotation speed is specified for the turbocompressor 103, the live steam valve 108*a* is actuated by means of the rotation speed feedback device 109 in such a way that the quantity of steam fed from the live steam line 106 to the steam turbine 108 is set in such a way that the turbocompressor 103** is set and held at the predefined rotation speed.

For control and process engineering reasons, the steam turbine 108 which drives the turbocompressor 103 is designed to be overdimensioned. The steam turbine 108 must, for the minimum parameters of the live steam line 106, make available the maximum necessary drive power for the turbocompressor 103. Apart from this, the steam turbine 108 must enable the turbocompressor 103 to be run up even with reduced live steam parameters. For this reason, the steam turbine 108 is only subject to about 70% of the maximum steam throughput when operating as rated. A consequence of this is that the steam turbine 108 is run for most of its operating time with the live steam valve **108*a* throttled back. Because of this, the efficiency of the steam turbine 108** is far below its maximum efficiency.

The excess live steam which is available in the live steam line 106 is fed away by means of the steam turbine 102 and the generator 101. However, the additional provision of the steam turbine 102 and the generator 106 in the plant is demanding and costly.

FIG. 3 shows a conventional string, having a generator 101, a steam turbine 102 and a turbocompressor 103. The steam turbine 102 is fed with live steam from a live steam line 106 and for drive purposes is coupled to the generator 101 by means of a coupling 104, and to the turbocompressor 103 by means of a coupling 105.

The electrical power produced in the generator 101 is fed into an electrical network 107. The turbocompressor 103 is operated at a constant rotation speed.

For the reasons previously cited, at its rated load and partial load the steam turbine 102 is run throttled back, so that the efficiency of the steam turbine 102 also lies below its optimum efficiency. Further, there is no possibility of regulating the turbocompressor 103 by its rotation speed, which leads to a loss of efficiency for the entire process.

SUMMARY OF INVENTION

It is the object of the invention to devise a generator-steam turbine-turbocompressor string and a method of operating the same whereby the generator-steam turbine-turbocompressor string has a high level of efficiency, can be well regulated and has low investment costs.

The inventive generator-steam turbine-turbocompressor string has a variable frequency generator, a steam turbine, and a turbocompressor which can be driven by the generator and/or the steam turbine, which are coupled together as a string on a shaft, where the generator can be electrically coupled into an electrical network for the supply of mains power and the steam turbine can be connected to a live steam feed pipe for feeding the steam turbine with live steam, so that rotation speed of the generator-steam turbine-turbocompressor string can be regulated by variation of the mains power supplied and/or by the live steam feed.

The method in accordance with the invention for operating the generator-steam turbine-turbocompressor string has the steps:

Providing the generator-steam turbine-turbocompressor string; varying the mains power supplied to the generator and/or varying the live steam feed to the steam turbine for the purpose of regulating the rotation speed of the generator-steam turbine-turbocompressor string.

In the generator-steam turbine-turbocompressor string, the turbocompressor can be driven by the steam turbine, whereby the process energy supplied to the string is completely converted. Because of the fact that the steam turbine drives the generator, no additional generator drive is provided, so that the investment costs for the generator-steam turbine-turbocompressor string are low.

The steam turbine in the generator-steam turbine-turbocompressor string can be run with the steam regulation valve set fully open. This results in a high efficiency for the steam turbine, so that the yield from the process energy is high.

Further, it permits the power of the turbocompressor in the generator-steam turbine-turbocompressor string to be regulated by varying the rotation speed, so that the power regulation of the turbocompressor is efficient.

When running up the turbocompressor, the generator can be operated as a motor, by which means an additional drive power is provided by the generator when the turbocompressor is being run up. This means that the steam turbine does not need to be designed in such a way that running up the turbocompressor can be effected when the steam parameters may be low and with a high power demand from the turbocompressor. Hence the steam turbine can be of cost-effective construction, so that the investment costs for the steam turbine are low. Apart from this, the steam turbine can be run unthrottled or only lightly in normal operation, so that the efficiency of the steam turbine is high.

The steam turbine will preferably have a live steam valve for feeding the live steam from the live steam feed facility to the steam turbine, whereby the live steam feed can be regulated with the live steam valve so that the rotation speed of the generator-steam turbine-turbocompressor string can be regulated by means of the live steam valve.

This makes it possible to regulate the feed of energy to the steam turbine using the live steam valve, which has an appropriate valve positioner for this purpose. This makes it simple to regulate the power output of the steam turbine and with it the rotation speed of the steam turbine.

It is further preferred that the generator-steam turbine-turbocompressor string has a frequency converter through which the generator can be electrically coupled to the electrical network for the supply of mains power and the power of the generator can be regulated, so that the rotation speed of the generator-steam turbine-turbocompressor string can be regulated by means of the frequency converter.

By means of the frequency converter, the power output of the generator can be varied when the mains power supply is used, so that the generator's power demand can be matched to the power demand of the turbocompressor. This means that the drive power of the steam turbine can set and thus can be matched to the power available from the live steam feed facility. By this means, all the steam available from the live steam feed facility can be expanded in the steam turbine, while the turbocompressor can be operated in a desired operating state.

It is preferred that the generator is capable of being operated both in generation mode and also in drive motor mode.

If the generator is operated in drive motor mode, then the generator provides additional drive power. This additional drive power can, for example, be necessary when running up the turbocompressor if, for example, the steam availability from the live steam feed facility is too low to run up the turbocompressor. This makes it possible to run up the turbocompressor even though the drive power of the steam turbine alone would be insufficient. In the drive motor mode, the generator draws power from the mains supply.

Preferably, the generator will be a high-speed generator.

In addition, for the method for operating the generator-steam turbine-turbocompressor string the preferred steps are: provision of the steam turbine with the live steam valve; variation of the setting of the live steam valve for the purpose of regulating the rotation speed of the generator-steam turbine-turbocompressor string; for normal operation: operate the steam turbine with the live steam valve set fully open.

By this means the steam turbine is, in normal operation, operated at its rated load and not under partial load, so that the efficiency of the steam turbine is high.

In addition, for the method for operating the generator-steam turbine-turbocompressor string the preferred steps are: provision of the generator-steam turbine-turbocompressor string with the frequency converter; variation of the power of the generator using the frequency converter for regulating the rotational speed of the generator-steam turbine-turbocompressor string.

Apart from this, for the method for operating the generator-steam turbine-turbocompressor string the preferred steps are: provision of a generator which can be operated both in generator mode and in drive motor mode; in the case of run-up operation: operation of the generator in drive motor mode.

BRIEF DESCRIPTION OF THE DRAWINGS

The invention is shown below with reference to a preferred exemplary embodiment of the inventive generator-steam turbine-turbocompressor string. Shown are.

DETAILED DESCRIPTION OF INVENTION

Figure 1:
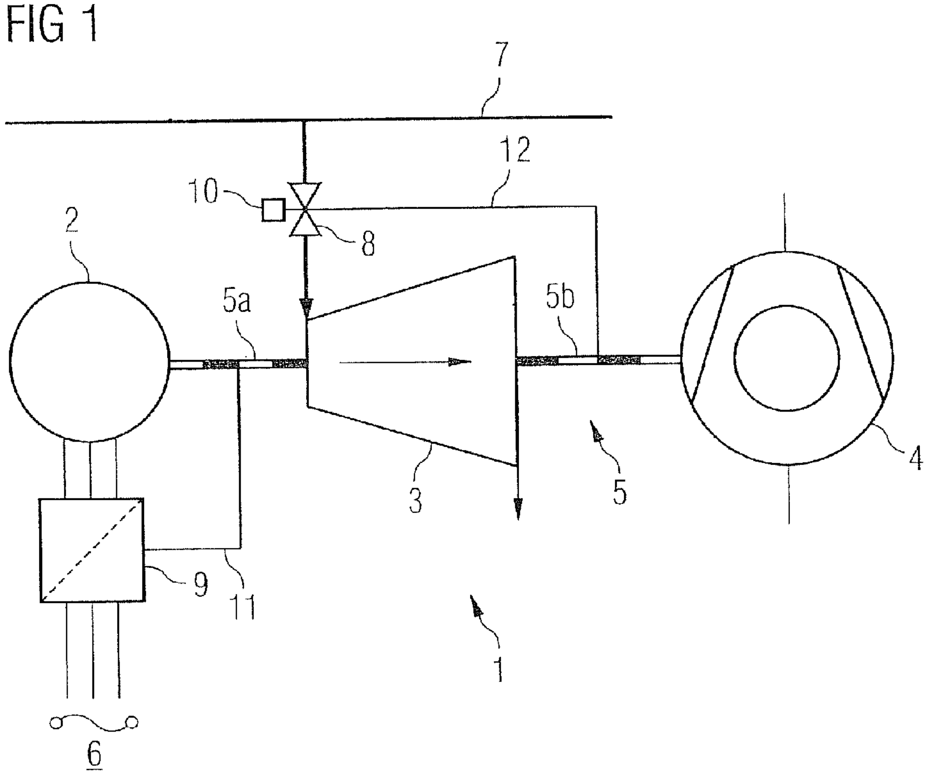
FIG. 1 a schematic illustration of the inventive generator-steam turbine-turbocompressor string, FIG. 2 a steam turbine-turbocompressor string and a steam turbine-generator string in accordance with the prior art, and FIG. 3 a generator-steam turbine-turbocompressor string in accordance with the prior art.
Figure 2:
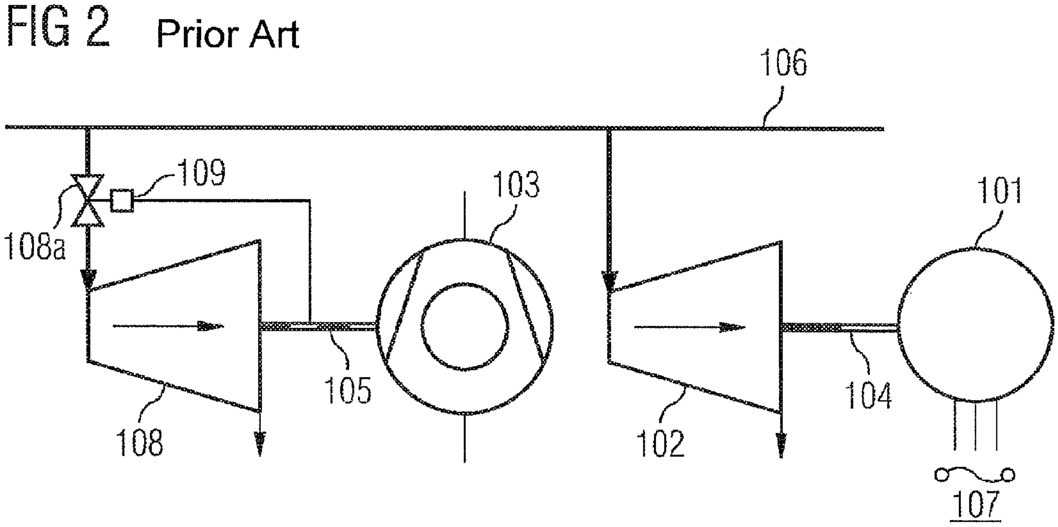
FIG 2 Prior Art
Figure 3:
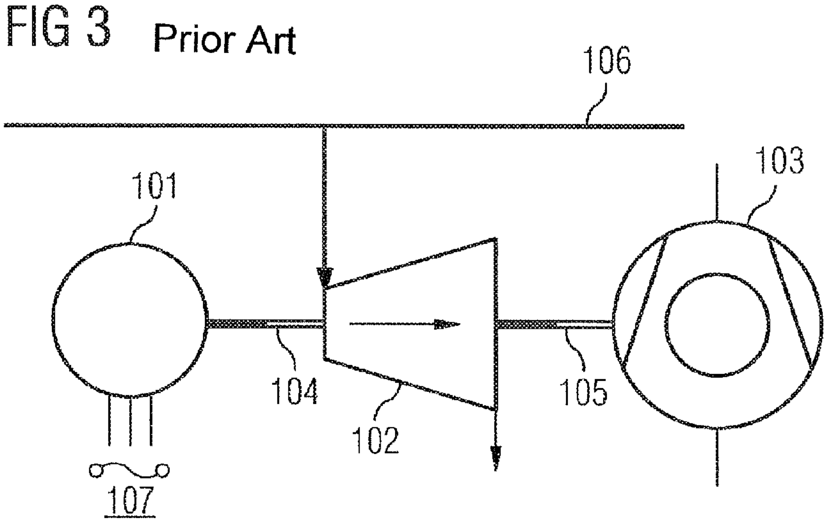
FIG 3 Prior Art

As can be seen from FIG. 1, a generator-steam turbine-turbocompressor string 1 has a generator 2, a steam turbine 3 and a turbocompressor 4, which form a shaft assembly 5. The steam turbine 3 is coupled to drive the generator 2 by means of a first coupling **5*a* and to drive the turbocompressor 4 by means of a second coupling 5*b*. The steam turbine 3 is operated using steam from a live steam feed facility 7, where the steam flow to the steam turbine 3 can be regulated by a live steam valve 8. The live steam valve 8 is linked to the rotation speed of the shaft assembly 5 by means of a rotation speed feedback device 10 and its associated rotation speed feedback device line 12. By means of this rotation speed feedback device 10 and the rotation speed feedback device line 12, the live steam valve 8 can be actuated in such a way that the rotation speed of the shaft assembly 5** is regulated.

The generator 2 is coupled via a frequency converter 9 into an electrical network 6 for the supply of mains power. The frequency converter 9 is linked to the rotation speed of the shaft assembly 5 by means of a further rotation speed feedback device line 11.

The live steam valve 8 and the rotation speed feedback device 10 and the rotation speed feedback device line 12 equip the turbine 3 for driving of the turbocompressor 4 at a regulated rotation speed. In addition, the steam turbine 3 is combined on one shaft assembly 5 for the purpose of driving the generator 2. The generator 2 and the frequency converter 9 can, also be operated as a motor if the external conditions call for additional auxiliary energy when the turbocompressor is being started up. In normal operation, the steam turbine 3 is run with the live steam valve 8 set fully open, so that in rated operation the steam turbine can be operated at a high efficiency.

The excess power which exists at rated operation of the steam turbine 3 is used in the generator 2 for generating electrical power.

With the help of the frequency converter 9, the generator 2 produces alternating current at the network frequency of the network 6 concerned, which can be fed into the network 6. In case of need, the generator 3 can operate as a motor to provide additional mechanical power for running up the turbocompressor 4. Rotation speed regulation of the shaft assembly 5 is effected either by adjustment of the mains power fed in or, when the power from the generator 2 is constant, by means of the live steam valve 8 on the steam turbine 2. Control of the power of the generator 2 is effected in the frequency converter 9.

The invention claimed is:

1. A generator-steam turbine-turbocompressor string, comprising:

a variable frequency generator;

a steam turbine;

a turbocompressor which is driven by the generator and/or the steam turbine;

a frequency converter; and a live steam valve, wherein the generator and the steam turbine are coupled together to form a shaft assembly, wherein the generator may be electrically coupled into an electrical network for the purpose of feeding in a mains power to the generator-steam turbine-turbocompressor string, wherein the steam turbine is connected to a live steam feed facility for feeding live steam to the steam turbine, wherein a rotation speed of the generator-steam turbine-turbocompressor string is regulated by varying the mains power fed in and by a feed of live steam, wherein the frequency converter electrically couples the generator to the electrical network in order to supply the mains power to the electrical network and a power of the generator is regulated, wherein the rotation speed of the generator-steam turbine-turbocompressor string is regulated using the frequency converter wherein a rotation speed of the shaft assembly is linked to the frequency converter by a first rotation speed feedback device, wherein the live steam valve feeds the live steam from the live steam feed facility to the steam turbine whereby the live steam valve is used to regulate the feed of live steam, and wherein a second rotation speed feedback device which is linked to the rotation speed of the shaft assembly is used to actuate the live steam valve, so that the rotation speed of the shaft assembly is regulated using the live steam valve.

2. The generator-steam turbine-turbocompressor string as claimed in claim 1, wherein the generator is operated both in a generator mode and also in a drive motor mode.

3. The generator-steam turbine-turbocompressor string as claimed in claim 1, wherein the generator is a high-speed generator.

4. A method for operating a generator-steam turbine-turbocompressor string, comprising:

providing the generator-steam turbine-turbocompressor string;

varying a mains power supplied to a generator and varying a live steam feed to a steam turbine for the purpose of regulating a rotation speed of the generator-steam turbine-turbocompressor string;

providing a live steam valve for the steam turbine;

varying a setting of the live steam valve for the purpose of regulating the rotation speed of the generator-steam turbine-turbocompressor string;

providing a frequency converter connected to the generator-steam turbine-turbocompressor string;

varying a power of the generator using the frequency converter for the purpose of regulating the rotation speed of the generator-steam turbine-turbocompressor string, wherein the generator-steam turbine turbocompressor string includes the generator, the steam turbine, and a turbocompressor which form a shaft assembly, wherein the frequency converter is linked to a rotation speed of the shaft assembly by a first rotation speed feedback device, wherein the live steam valve is linked to the rotation speed of the shaft assembly by a second rotation speed feedback device, wherein in normal operation the live steam valve of the steam turbine is set to a fully open position.

5. The method as claimed in claim 4, further comprising:

providing the generator in a form capable of operation in a generator mode and also in a drive motor mode, wherein when the turbocompressor calls for additional auxiliary energy, the operation of the generator is in drive motor mode.

* * * * *